United States Patent [19]

Ishizuka

[11] 4,416,190
[45] Nov. 22, 1983

[54] SEAL FOR COMPRESSOR

[75] Inventor: Yutaka Ishizuka, Konan, Japan

[73] Assignee: Diesel Kiki Co., Ltd., Tokyo, Japan

[21] Appl. No.: 214,097

[22] Filed: Dec. 8, 1980

[30] Foreign Application Priority Data

Dec. 13, 1979 [JP] Japan .......................... 54-172526[U]
Jan. 31, 1980 [JP] Japan ............................ 55-11033[U]

[51] Int. Cl.³ ............................. F04B 1/16; F04B 1/18
[52] U.S. Cl. ......................................... 92/71; 417/269
[58] Field of Search ............... 417/269, 266, 571, 454; 285/DIG. 18; 92/71

[56] References Cited

U.S. PATENT DOCUMENTS 3,042,248  7/1962  Krueger .................... 285/DIG. 18
3,561,648  2/1971  Humphrey .......................... 417/479
4,011,029  3/1977  Shimizu .............................. 417/269
4,226,572 10/1980  Nakayama et al. ................. 417/269

FOREIGN PATENT DOCUMENTS 2258584  8/1975  France ...................... 285/DIG. 18

Primary Examiner—William L. Freeh
Attorney, Agent, or Firm—Frishauf, Holtz, Goodman & Woodward

[57] ABSTRACT

A seal is provided which seals the junction between the cylinder block of a compressor and a cylinder head secured to an end of the cylinder block, which comprises a gasket interposed between the cylinder block and the cylinder head. The gasket is formed integrally with an axial swell located in the vicinity of its outer peripheral edge extending along its whole circumference. The swell of the gasket is elastically held between the cylinder block and one of the cylinder head and a valve plate interposed between the cylinder block and the cylinder head to seal the junction between the two members.

21 Claims, 8 Drawing Figures

SEAL FOR COMPRESSOR

BACKGROUND OF THE INVENTION

The present invention relates to a compressor for air conditioning systems, and more particularly to seals for use in such a compressor.

Swash-plate type compressors are widely used in air conditioning systems for compressing refrigerant which is recirculated within the systems. The type compressor generally comprises a cylinder block formed therein with a plurality of axial cylinder bores within which are slidably received pistons, a pair of cylinder heads secured to opposite ends of the cylinder block with a pair of valve plates intervening therebetween, a drive shaft extending through the cylinder block and one of the cylinder heads along their axes, and a swash plate housed within a swash plate chamber formed within the cylinder block and secured on the drive shaft while engaging at its peripheral fringe with the pistons.

Interposed between the cylinder block and each cylinder head are a gasket, a suction valve, a gasket, a valve plate and another gasket which are arranged in the order mentioned above.

However, the compressor has a drawback that the use of not a few parts as mentioned above which are used between the cylinder block and each cylinder head invites a high production cost as well as an insufficient fluidtightness between the cylinder block and each cylinder head.

To eliminate the above drawback, an O ring is conventionally used between the cylinder block and the cylinder head in place of gaskets or together with the gaskets. Although the use of an O ring can improve the fluidtightness between the above two members, it requires the work of forming a groove in one of these members for receiving the O ring. Moreover, not a few parts are still used between the cylinder block and the cylinder head.

OBJECT OF THE INVENTION

It is an object of the invention to provide a sealing device for compressors, which comprises a gasket provided between the cylinder block and each cylinder head, the gasket being formed with an axial swell located in the vicinity of its outer peripheral edge and extending along its whole circumference, whereby the swell is elastically held between the cylinder block and the cylinder head to provide a hermetic sealing of the junction between the two members. The sealing device is therefore simplified in structure, contributing to a reduction in the number of parts used between the cylinder block and the cylinder head as well as a reduction in the production cost.

The above and other objects, features and advantages of the invention will be more apparent from the ensuing description taken in connection with the accompanying drawings.

DETAILED DESCRIPTION

Figure 1:
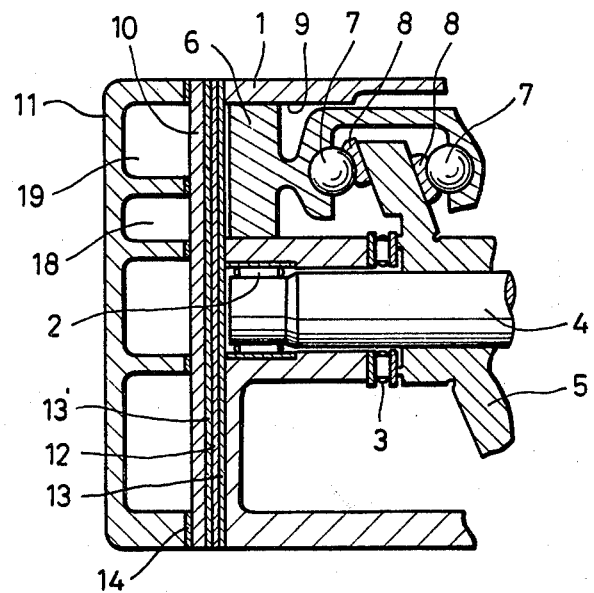
FIG. 1 is longitudinal sectional fragmentary view showing a seal arrangement provided between the cylinder head and the cylinder block on a half side of a conventional swash-plate type compressor.

Referring now to the drawings, wherein like reference characters designate like or corresponding parts throughout all the views, FIG. 1 illustrates a conventional swash-plate type compressor which is used in general as a refrigerant compressor for air conditioning systems. Reference numeral 1 designates a cylinder block which is usually made of an aluminum alloy casting and which is formed with a plurality of cylinder bores (only one of them is shown) axially extending therethrough. A cylinder head 11 is rigidly mounted on one end of the cylinder block 1 with a valve plate 10 intervening therebetween.

A drive shaft 4 extends through the cylinder block 1 along its axis and is supported by two radial bearings 2 and two thrust bearings 3 (each one of them is shown). Secured on this drive shaft 4 is a swash plate 5 which is disposed in engagement with pistons 6 received within the cylinder bores 9 via balls 7 and shoes 8 for rotation in unison with rotation of the drive shaft 4 to cause reciprocating motions of the pistons 6 within the respective cylinder bores 9 to carry out regrigerant compression actions.

The valve plate 10 is formed therethrough with suction bores (not shown) and discharged bores (not shown) communicating the cylinder bores 9 with a suction chamber 18 and a delivery chamber 19 both formed within the cylinder head 11, respectively. A sheet-like suction valve 12, which is fabricated in a separate body from the valve plate 10, is arranged on one side of the valve plate 10, while discharge valves (not shown) are mounted integrally on the other side of the valve plate 10 in a relation facing the respective discharge bores. The suction valve 12 generally is not mounted integrally on the valve plate 10 but is formed of a thin steel disc plate formed integrally with valves and is disposed in contact with one end surface of the valve plate 10 facing the cylinder block 1. Gaskets 13, 13' each in the form of a disc are interposed between the suction valve 12 and the cylinder block 1, and the valve 12 and the valve plate 10, respectively. The gaskets 13, 13' are each formed with through bores (not shown) communicating, respectively, with the cylinder bores 9 and the suction bores and discharge bores (not shown) in the valve plate 10. Another gasket 14 in the form of a ring is interposed between the valve plate 10 and the cylinder head 11. Thus, the cylinder block 1 and the cylinder head 11 have interposed therebetween the gasket 13, the suction valve 12, the gasket 13', the valve plate 10 and the gasket 14 which are arranged in the above-mentioned order. The cylinder head 11 is urged against the cylinder block 1 by means of through bolts (not shown) axially inserted through the cylinder head 11 and the cylinder block 1 to firmly hold the above parts in an urged manner between the cylinder head 11 and the cylinder block so as to maintain a fluidtight condition between the compressor and the outside.

The above seal arrangement for compressors has the disadvantages that the use of gaskets 13, 13', 14 having different configurations leads to a high production cost and the fluidtightness between the cylinder block and the cylinder head is not sufficient due to the exposure of the peripheral edge of the valve plate 10 to the outer peripheral surface of the compressor.

Figure 2:
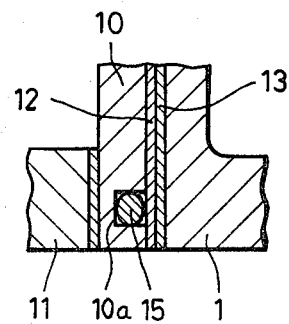
FIG. 2 is a longitudinal sectional fragmentary view of the compressor, showing a conventional seal arrangement.

Therefore, in some compressors the seal between the cylinder block 1 and the valve plate 10 is formed of a gasket 13 and an O ring 15 received within a groove 10a formed in the valve plate 10, as shown in FIG. 2, to exclude the aforementioned gasket 13'.

However, the arrangement of FIG. 2 involves the drawbacks of the use of not a few parts between the cylinder block 1 and the cylinder head 11 and the necessity of the work of forming the groove 10a which lead to a high production cost.

Figure 3:
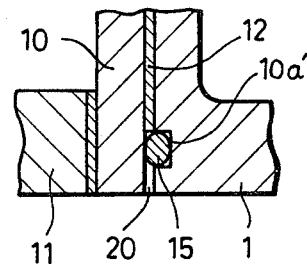
FIG. 3 is a view similar to FIG. 2, showing a further conventional seal arrangement.

To obviate the above drawbacks, an alternative seal arrangement has conventionally been employed as shown in FIG. 3, in which the seal is formed solely of an O ring 15 interposed between the valve plate 10 and the cylinder block 1 with no gasket corresponding to the gasket 13 interposed therebetween. This arrangement also has the drawbacks of the necessity of the work of forming a groove 10a' in the cylinder block 1 for receiving the O ring 15 and the likelihood of the O ring 15 being protruded to the outside of the compressor through the gap 20 between the valve plate 10 and the cylinder block 1 which are spaced from each other by a distance corresponding to the thickness of the suction valve 12.

Figure 4:
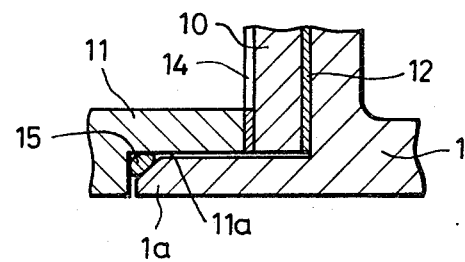
FIG. 4 is a view similar to FIG. 2, showing a still further conventional seal arrangement.

A still further arrangement has also been used as shown in FIG. 4. According to this arrangement, the cylinder block 1 has a peripheral extension 1a axially extending integrally from the outer periphery of an end surface of the cylinder block 1. A suction valve 12, a valve plate 10 and a gasket 14 are arranged in the mentioned order between the cylinder block 1 and the cylinder head 11. An O ring 15 is interposed between the tip of the peripheral extension 1a and a stepped portion 11a formed in the cylinder head 11, with the cylinder head 11 urged against the cylinder block 1 by means of through bolts, not shown, extending through the cylinder head 11 and the cylinder block 1.

The above arrangement of FIG. 4, in which the single O ring 15 seals both the junction between the valve plate 10 and the cylinder block 1 and the junction between the valve plate 10 and the cylinder head 11, while the gasket sealing is used at only one point, is advantageous over the aforedescribed conventional arrangements in respect of both minimization of constituent parts and sealing ability. However, even with this arrangement, the drawback of high production cost cannot be overcome owing to the use of both the gasket and the O ring and the necessity of the work of forming the stepped portion 11a in the cylinder head 11.

Figure 5:
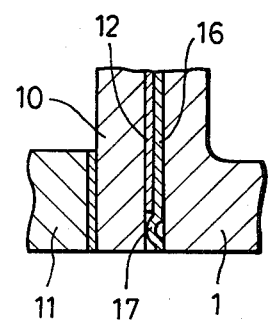
FIG. 5 is a longitudinal sectional fragmentary view of the compressor, showing a seal arrangement according to an embodiment of the present invention.
Figure 6:
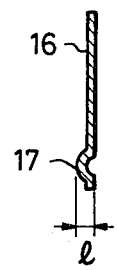
FIG. 6 is a sectional view showing an essential part of the gasket used in the seal arrangement of FIG. 5.

FIGS. 5 and 6 illustrate a seal arrangement according to an embodiment of the present invention. Interposed between the valve plate 10 and the cylinder block 1 are a suction valve 12 which is disposed in contact with an end surface of the valve plate 10 and a gasket 16 disposed in contact with an end surface of the cylinder block 1. The suction valve 12 has a radial size shortened such that the outer peripheral edge of the valve 12 is located on the end surface of the valve plate 10 at a predetermined distance from the outer peripheral surfaces of the valve plate 10 and the cylinder block 1. The gasket 16 is a metal gasket which is formed of a metal plate having elasticity such as steel or aluminum and coated with rubber stuck thereto by baking. The gasket 16 has an axial swell 17 formed integrally thereon by means of embossing press or like means, which swell is located in the vicinity of the outer peripheral edge of the gasket 16 and extends along the whole circumference of same. In the illustrated embodiment, the swell 17 is in the form of a semicircle obtained by axially curving a circumferential portion of the gasket 16 in the vicinity of its outer peripheral edge. Also, the swell 17 is located radially outwardly of the outer peripheral edge of the suction valve 12, with its vertex disposed in contact with the end surface of the valve plate 10 and the portions other than the swell 17 disposed in contact with the opposed surfaces of the suction valve 12 and the cylinder block 1. The gasket 16 has its swell 17 resiliently held between the valve plate 10 and the cylinder block 1 due to the fastening force of through bolts, not shown, extending through the cylinder head 11 and the cylinder block 1.

The swell 17 of the gasket 16 in a free state has an axial size l (FIG. 6) slightly larger than the sum of the thicknesses of the suction valve 12 and the gasket 16 both in a free state. By setting the axial size of the swell 17 at such a value, when the gasket 16 is inserted between the cylinder block 1 and the valve plate 10, the swell 17 can be held in close and urging contact with the opposed end surfaces of the two members 1, 10 to maintain a fluidtight condition between them. Thus, leakage of gas through the gap between the two members 1, 10 can be positively prevented.

Incidentally, preferably the swell 17 should have a thickness 1.5–2 times as large as that of the other portions of the gasket 16 (usually, the latter is within a range of 0.25–1.25 mm), and a radial size of 0.5–3 mm. The base metal plate of the gasket 16 may be coated with tetrafluoroethylene or other suitable synthetic resins by means of fusion welding or like means, instead of rubber as previously mentioned.

Figure 7:
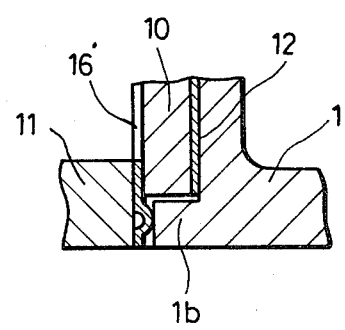
FIG. 7 is a longitudinal sectional fragmentary view of the compressor, showing a seal arrangement according to a further embodiment of the present invention.
Figure 8:
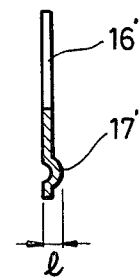
FIG. 8 is a sectional view showing an essential part of the gasket used in the seal arrangement of FIG. 7.

FIGS. 7 and 8 illustrate a seal arrangement according to a further embodiment of the present invention. The valve plate 10, which is interposed between the cylinder block 1 and the cylinder head 11, has a radial size shortened such that its outer peripheral edge is located on the opposed end surfaces of the above members 1, 11 at a predetermined distance from the outer peripheral surfaces of them. The cylinder block is formed integrally with a peripheral extension 1b axially extending from the periphery of its one end surface toward the cylinder head 11. This peripheral extension 1b is located radially outwardly of the peripheral edge of the valve plate 10 and has its tip spaced from the associated end surface of the cylinder head 11 by a predetermined distance.

A suction valve 12, which has a radial size substantially the same as that of the valve plate 10, is interposed between the valve plate 10 and the cylinder block 1, and a gasket 16' in the form of a ring is interposed between the valve plate 10 and the cylinder head 11, respectively. Like the gasket 16 used in the embodiment of FIGS. 5 and 6, also this gasket 16' is a metal gasket which is made of an elastic metal plate coated with rubber stuck thereto by means of baking and has an axial swell 17' similar to the swell 17 shown in FIGS. 5 and 6, formed integrally thereon by means of embossing press or like means, which is located in the vicinity of its outer peripheral edge and extends along its whole circumference. The swell 17' has its vertex disposed in contact with the tip surface of the peripheral extension 1b of the cylinder block 1. The sum of the axial size l of the swell 17' in a free state and the length of axial size of the peripheral extension 1b is designed slightly larger than the sum of the thicknesses of the other portions of the gasket 16' in a free state, the valve plate 10 and the suction valve 12 in a free state so that when the cylinder head 11 is fastened to the cylinder block 1 by through bolts as aforementioned, the gasket 16' has its opposite end surfaces brought into close contact with the cylinder head 11 and the valve plate 10, with its swell 17' elastically deformed to have its vertex brought into close contact with the tip surface of the peripheral extension 1b. Thus, the sealing of the junction between the radially outer portions of the valve plate 10 and the cylinder head 11 as well as the junction between the valve plate 10, the suction valve 12 and the cylinder block 1 is achieved at the same time.

Although the aforegiven two embodiments are directed to seals applied to a swash-plate type compressor, the seal according to the present invention is also applicable to ordinary reciprocating compressors.

Obviously many modifications and variations of the present invention are possible in the light of the above description. It is therefore to be understood that within the scope of the appended claims the invention may be practiced otherwise than as specifically described.

What is claimed is:

1. A compressor comprising:
    a cylinder block;
    a cylinder head rigidly mounted on one end of said cylinder block;
    a valve plate interposed between said cylinder block and said cylinder head;
    a sheet-like suction valve interposed between said cylinder block and said valve plate and having an outer peripheral edge; and
    a gasket having elasticity and provided at least between said cylinder block and said cylinder head; said gasket having a radially inner flat portion, a radially outer flat portion and an axially projected swell located between said radially inner and said radially outer flat portions; said radially inner flat portion, said radially outer flat portion and said axially projected swell being formed integrally on said gasket; said axially projected swell being located in the vicinity of an outer peripheral edge of said gasket and extending along the whole circumference of said gasket; said axially projected swell being located radially outwardly of the outer peripheral edge of said sheet-like suction valve; said radially inner flat portion, said radially outer flat portion and said axially projected swell being wholly fixedly interposed between said cylinder block and at least one of said cylinder head and said valve plate and being elastically held within a clearance therebetween to seal at least the junction between said cylinder block and said cylinder head; said axially projected swell having, in a free state, a predetermined axial size which is larger than the sum of the thicknesses of said suction valve and other portions of said gasket, both in a free state; said clearance having a width thereof substantially determined by the sum of the thicknesses of said other portions of said gasket and said suction valve; and said axially projected swell being disposed within said clearance in a manner maintaining a swelled state thereof.

2. The compressor as claimed in claim 1, wherein said gasket comprises a metal plate having elasticity and coated with rubber stuck thereto.

3. The compressor as claimed in claim 1, wherein said gasket comprises a metal plate having elasticity and coated with a synthetic resin.

4. The compressor as claimed in claim 1, wherein said swell comprises an axially curving circumferential portion of said gasket in the vicinity of an outer peripheral edge thereof.

5. The compressor as claimed in claim 1, wherein said radially inner flat portion, said radially outer flat portion and said axially projected swell of said gasket are wholly fixedly interposed between said cylinder block and one of said cylinder head and said valve plate.

6. The compressor as claimed in claim 1, wherein said axially projected swell has, in a free state, an axial length 1.5 to 2 times as large as the thickness of said other portions of said gasket, in a free state.

7. The compressor as claimed in claim 1, wherein said gasket is interposed between said valve plate and said cylinder block, said valve plate and said cylinder block having mutually facing surfaces thereof disposed in urging contact with said swell of said gasket.

8. The compressor as claimed in claim 7, wherein said sheet-like suction valve is interposed between said gasket and said valve plate.

9. The compressor as claimed in claim 8, wherein said swell of said gasket comprises an axially curving circumferential portion of said gasket in the vicinity of an outer peripheral edge thereof.

10. The compressor as claimed in claim 1, wherein said cylinder block has a peripheral extension formed integrally on an end thereof facing said cylinder head, said peripheral extension axially extending from an outer periphery of said end of said cylinder block toward said cylinder head and located radially outwardly of said valve plate, said peripheral extension having a tip spaced from an end surface of said cylinder head facing said cylinder block, at least a portion of said gasket being interposed between said cylinder head and said valve plate and having said swell elastically held between said end surface of said cylinder head and the tip surface of said peripheral extension of said cylinder block.

11. The compressor as claimed in claim 10, wherein said swell of said gasket is formed by axially curving a circumferential portion of said gasket in the vicinity of an outer peripheral edge thereof, said swell having a vertex thereof disposed in urging contact with the tip surface of said peripheral extension of said cylinder block.

12. The compressor as claimed in claim 10, wherein said gasket comprises a metal plate having elasticity and coated with rubber stuck thereto.

13. The compressor as claimed in claim 10, wherein said gasket comprises a metal plate having elasticity and coated with a synthetic resin.

14. The compressor as claimed in claim 10, wherein said swell comprises an axially curving circumferential portion of said gasket in the vicinity of an outer peripheral edge thereof.

15. The compressor as claimed in claim 1, wherein at least a portion of said radially inner flat portion of said gasket is interposed between said cylinder head and said valve plate, and wherein at least said axially projected swell of said gasket is interposed between said cylinder head and said cylinder block, said radially outer flat portion of said gasket also being interposed between said cylinder head and said cylinder block.

16. The compressor as claimed in claim 15, wherein said gasket comprises a metal plate having elasticity and coated with rubber stuck thereto.

17. The compressor as claimed in claim 15, wherein said gasket comprises a metal plate having elasticity and coated with a synthetic resin.

18. The compressor as claimed in claim 15, wherein said swell comprises an axially curving circumferential portion of said gasket in the vicinity of an outer peripheral edge thereof.

19. The compressor as claimed in claim 15, wherein said gasket is arranged spaced from said sheet-like suction valve and communicates with said sheet-like suction valve through a clearance provided therebetween.

20. The compressor as claimed in claim 1, wherein said gasket is arranged spaced from said sheet-like suction valve and communicates with said sheet-like suction valve through a clearance provided therebetween.

21. The compressor as claimed in claim 20, wherein said radially inner flat portion, said radially outer flat portion and said axially projected swell of said gasket are wholly fixedly interposed between said cylinder block and one of said cylinder head and said valve plate.

* * * * *